United States Patent
Itskovich et al.

(10) Patent No.: US 6,903,553 B2
(45) Date of Patent: Jun. 7, 2005

(54) METHOD AND APPARATUS FOR A QUADRUPOLE TRANSMITTER FOR DIRECTIONALLY SENSITIVE INDUCTION TOOL

(75) Inventors: Gregory Itskovich, Houston, TX (US); Alexander Bespalov, Spring, TX (US); Borislav J. Tchakarov, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/388,871

(22) Filed: Mar. 14, 2003

(65) Prior Publication Data

US 2004/0046560 A1 Mar. 11, 2004

Related U.S. Application Data

(60) Provisional application No. 60/408,615, filed on Sep. 6, 2002.

(51) Int. Cl.[7] ................................................. G01V 3/10
(52) U.S. Cl. ....................................... 324/339; 324/338
(58) Field of Search ................................ 324/338–339, 324/345–346, 348, 351, 354–356, 366–369

(56) References Cited

U.S. PATENT DOCUMENTS 4,712,070 A     12/1987   Clark et al.
6,100,696 A   *   8/2000   Sinclair ...................... 324/339

FOREIGN PATENT DOCUMENTS

GB         2369890 A     6/2002

* cited by examiner

Primary Examiner—Bot LeDynh
(74) Attorney, Agent, or Firm—Madan, Mossman & Sriram, P.C.

(57) ABSTRACT

The present invention provides a method and apparatus for performing resistivity measurements for the purpose of geo-steering with 180-degree azimuth resolution. All the measurements represent a complementary set of data acquired in two operational modes. The directional mode providing sensitivity of the received signals to the azimuth characteristics of the formation. The deep mode provides a large depth of investigation for resistivity determination and bed boundary detection. The directional mode can be implemented using one receiving coil placed in between quadruple type transmitter. The deep mode represents either array induction measurements or multiple propagation resisitivity (MPR) measurements that provide high depth of investigation for resistivity determination and bed boundary detection.

31 Claims, 8 Drawing Sheets

METHOD AND APPARATUS FOR A QUADRUPOLE TRANSMITTER FOR DIRECTIONALLY SENSITIVE INDUCTION TOOL

CROSS REFERENCE TO RELATED APPLICATIONS

This patent application claims priority from U.S. Provisional Patent Application Ser. No. 60/408,615 filed on Sep. 6, 2002 entitled Method and Apparatus for the Use of Multicomponent Induction Tool and Cross Component Measurements for Geosteering and Formation Resistivity Data Interpretation in Horizontal Wells" by Wang, Tabarovksy, Tchakarov, Signorelli, and Fang.

BACKGROUND OF THE INVENTION

1. Field of the Invention

The present invention pertains to the field of performing resistivity measurements for the purpose of geo-steering in two operational modes. A directional mode provides sensitivity of the received signals to the azimuthal characteristics of the formation and a deep mode provides large depth of investigation for resistivity determination and bed boundary detection relative to the borehole and tool.

2. Summary of the Related Art

Electromagnetic induction and wave propagation logging tools are commonly used for determination of electrical properties of formations surrounding a borehole. These logging tools give measurements of apparent resistivity (or conductivity) of the formation that, when properly interpreted, reasonably determine the petrophysical properties of the formation and the fluids therein.

The physical principles of electromagnetic induction resistivity well logging are described, for example, in H. G. Doll, *Introduction to Induction Logging and Application to Logging of Wells Drilled with Oil-Based Mud*, Journal of Petroleum Technology, vol. 1, p.148, Society of Petroleum Engineers, Richardson, Tex. (1949). Many improvements and modifications to electromagnetic induction resistivity instruments have been devised since publication of the Doll reference, supra. Examples of such modifications and improvements can be found, for example, in U.S. Pat. No. 4,837,517; U.S. Pat. No. 5,157,605 issued to Chandler et al.; and U.S. Pat. No. 5,452,761 issued to Beard et al.

A typical electrical resistivity-measuring instrument is an electromagnetic induction military well logging instrument such as described in U.S. Pat. No. 5,452,761 issued to Beard et al. The induction logging instrument described in the Beard '761 patent includes a number of receiver coils spaced at various axial distances from a transmitter coil. Alternating current is passed through the transmitter coil, which induces alternating electromagnetic fields in the earth formations. Voltages, or measurements, are induced in the receiver coils as a result of electromagnetic induction phenomena related to the alternating electromagnetic fields. A continuous record of the voltages form curves, which are also referred to as induction logs. The induction instruments that are composed of multiple sets of receiver coils are referred to as multi-array induction instruments. Every set of receiver coils together with the transmitter is named as a subarray. Hence, a multi-array induction consists of numerous subarrays and acquires measurements with all the subarrays.

Voltages induced in the axially more distal receiver coils are the result of electromagnetic induction phenomena occurring in a larger volume surrounding the instrument, and the voltages induced in the axially proximal receiver coils are the result of induction phenomena occurring more proximal to the instrument. Therefore, different receiver coils see a formation layer boundary with different shoulder-bed contributions, or shoulder-bed effects. The longer-spaced receiver coils see the formation layer boundary at further distance from the boundary than the shorter-spaced receiver coils do. As a result, the logs of longer-spaced receiver coils have longer shoulder-bed effects than the logs of shorter-spaced receiver coils.

If the layers are not perpendicular to the axis of the instrument, the conductivity of the media surrounding the instrument can vary azimuthally, causing the inferences about the conductivity from the measurements of the induction voltage to be in error. A method for correcting the error is described in U.S. Pat. No. 5,774,360 issued to Xiao and Zhou. The method requires the relative dip angle as a priori information. The relative dip angle is the angle between the borehole axis and the normal of the bedding plane. Because the formation layers can also be inclined, the relative dip angle is normally unknown even though the wellbore deviation is known. U.S. Pat. No. 6,049,209 issued to Xiao and Geldmacher teaches another method has also been developed to interpret induction logs in the environments of relative inclination and anisotropy. The method requires the relative dip angle and the anisotropy coefficient as a priori information. The anisotropy coefficient can be defined as the ratio between the resistivity perpendicular to bedding and the resistivity parallel to bedding.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art. These eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however are those layers which are typically hydrocarbon-bearing and are of the most interest to the instrument user. Some earth formations which might be of commercial interest therefore may be overlooked by interpreting a well log made using the electromagnetic induction resistivity well logging instruments known in the art.

U.S. Pat. No. 5,999,883 issued to Gupta et al., (the "Gupta patent"), the contents of which are fully incorporated herein by reference, discloses a method for determining the horizontal and vertical conductivity of anisotropic earth formations. Measurements are made of electromagnetic induction signals induced by induction transmitters oriented along three mutually orthogonal axes. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to one of the orthogonal axes, which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes, which is parallel to the axis of the instrument is calculated, from the rotated magnitudes, with respect to the direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

The relative formation dip angle is vital for proper and accurate interpretation of data acquired by the new multi-component induction instrument. This newly developed induction instrument comprises three mutually orthogonal transmitter-receiver arrays. These configurations allow determination of both horizontal and vertical resistivities for an anisotropic formation in vertical, deviated, and horizontal boreholes. A description of the tool can be found in WO 98/00733, *Electrical logging of a laminated formation*, by Beard et al (1998). The transmitters induce currents in all three spatial directions and the receivers measure the corresponding magnetic fields ($H_{xx}$, $H_{yy}$, and $H_{zz}$). In this nomenclature of the field responses, the first index indicates the direction of the transmitter, the second index denotes the receiver direction. As an example, $H_{zz}$ is the magnetic field induced by a z-direction transmitter coil and measured by a z-directed receiver. The z-direction is parallel to the borehole. In addition, the instrument measures all other cross-components of the magnetic fields, i.e., $H_{xy}$, $H_{xz}$, $H_{yx}$, $H_{yz}$, $H_{zx}$, and $H_{zy}$.

The signals acquired by the main receiver coils ($H_{xx}$, $H_{yy}$, and $H_{zz}$) are used to determine both the horizontal and vertical resistivity of the formation. This is done by inverse processing techniques of the data. These inverse processing techniques automatically adjust formation parameters in order to optimize in a least-square sense the data match of the synthetic tool responses with measured data. Required inputs in this process are accurate information of the relative formation dip and relative formation azimuth. This information can be derived using in addition to the main signals ($H_{xx}$, $H_{yy}$, and $H_{zz}$) the data from the cross-components.

Conventional induction tools comprising only coaxial transmitter-receiver coil configurations do not have azimuthal sensitivity. Therefore, in a horizontal wellbore, the data do not contain information about directionality of the formation. It is not possible to distinguish whether a layer is above or below the borehole from these data alone. There is a need to be able to determine directionality of the formation.

SUMMARY OF THE INVENTION

The new quadrupole system of the present invention in combination with MPR enables MWD resistivity measurements with azimuthal sensitivity. The system consists of a duel loop transmitter and one coil receiver placed between transmitting coils. The moments of the transmitter and receiving coils are substantially perpendicular to the borehole axis. The optimal length of the system is about 1 m. In order to provide large depth of investigation the quadrupole system is preferably combined with existing MPR tools. The present invention provides a quadrupole system with azimuthal resolution in the directional mode and a MPR high depth of investigation in the deep resolution mode. To reduce ambiguity due to zero crossings in the data multi-frequency measurements as well as the measurements of both in-phase and quadrature components are performed.

The present invention provides a method and apparatus for performing resistivity measurements for the purpose of geo-steering with 180 degree azimuthal resolution. All the measurements represent a complementary set of data acquired in two operational modes. The directional mode providing sensitivity of the received signals to the azimuthal characteristics of the formation. The deep mode providing large depth of investigation for resistivity (Rt) determination and bed boundary detection. The directional mode can be implemented using one receiving coil placed in between quadruple type transmitter. The whole module is about 1 m in length while quadruple coils comprising transmitter are separated by about 10 cm distance. In another embodiment the deep mode represents an improvement over conventional multiple propagation resisitivity (MPR) measurements that provide a depth of investigation for resistivity determination and bed boundary detection.

Preferably, both directional and deep measurement modes are combined in one single tool. The tool comprises at least two transmitter coils (a quadruple transmitter) and an array of transversal coils in the receiver portion of the tool. The moments of the transmitting and receiving coils are perpendicular to the borehole axis. The transmitter provides a switch to switch polarity of the current in each of the transmitter coils. Several receiving coils are placed at the different distances from the quadruple transmitter, for example 1 meter between receiving coils. The present invention provides a resistivity tool that acquires data at several operating frequencies in the range of 100 kHz to 2 MHz. The preferred tool provides a controller and control program that performs switching polarity of the current in the transmitter coils so that the data of both directional and deep mode can be acquired. The deep mode data are acquired when magnetic moments of two transmitting loops are switched so that the moments point in the same direction and the directional mode data are acquired when the moments point in opposite directions. The opposing moments in the directional mode also reduce eddy currents induced in the conductive tool.

BRIEF DESCRIPTION OF THE FIGURES

The novel features of this invention, as well as the invention itself, will be best understood from the attached drawings, taken along with the following description, in which similar reference characters refer to similar parts, and in which.

DETAILED DESCRIPTION OF A PREFERRED EMBODIMENT

The present invention provides a method and apparatus for performing multiple propagation resistivity (MPR) logging measurements. The present invention provides for larger depth of investigation for resistivity (Rt) determination and bed boundary detection during reservoir navigation along with enhanced accuracy over a broad range of resistivities. The present invention provides MPR with resolving capability in azimuthal direction that leads to a increased and more effective usage of MPR for geo-steering. The present invention provides a new resistivity measurement aimed at resolving formation resistivities in the azimuth direction as well as along the borehole trajectory.

Figures 1A, 1B:
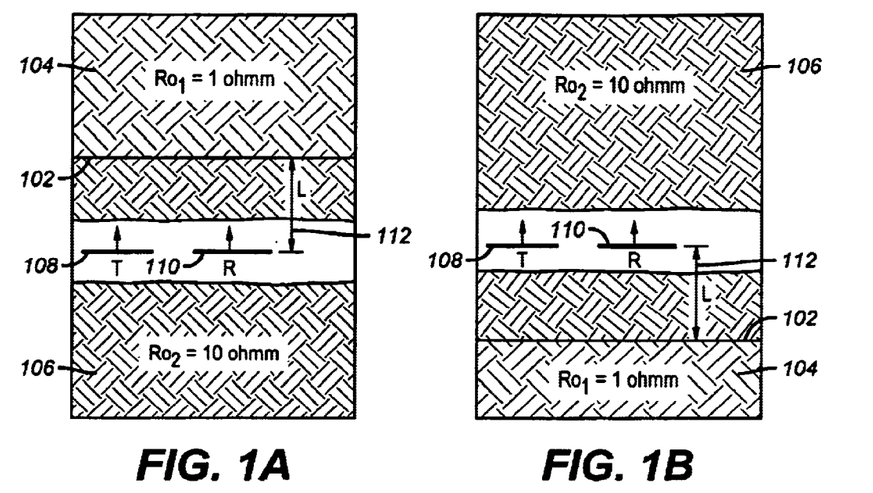
FIG. 1a and FIG. 1b illustrate a two-layered formation models with up and down boundary respectively.

Turning now to FIG. 1, FIG. 1 illustrates a two-layered formation models with up/down boundary 102. Resistivities of the layers 106, 104, are $\rho_1$=10 ohm-m and $\rho_2$=1 ohm-m respectively. The excitation dipole 108 is oriented in the same direction as receiving dipole 110. The tool (not shown) is placed at a different distance L, containing dipoles 108, 110 from the boundary 102 inside the resistive layer. The tool traverses a bore hole 930 considered to be horizontal and parallel to layer boundaries 102. The dipole-dipole measurements cannot distinguish between models with up and down boundaries. The present invention provides a quadrupole transmitter with azimuthal resolution.

FIG. 1a and FIG. 1b illustrate a two-layered formation with resistivities $\rho_1$=10 ohm-m and $\rho_2$=1 ohm-m and traditional ZZ dipole-dipole arrangement (ZZ refers to excitation dipole oriented in Z direction and receiving dipole oriented in the same Z direction). The tool is placed at a different distance L from the boundary inside the resistive layer The tool is traveling within a horizontal well (not shown) which is parallel to layer boundaries. In this situation ZZ dipole-dipole measurements can not distinguish between boundary positioning arrangements presented in FIG. 1a and FIG. 1b.

Figure 2:
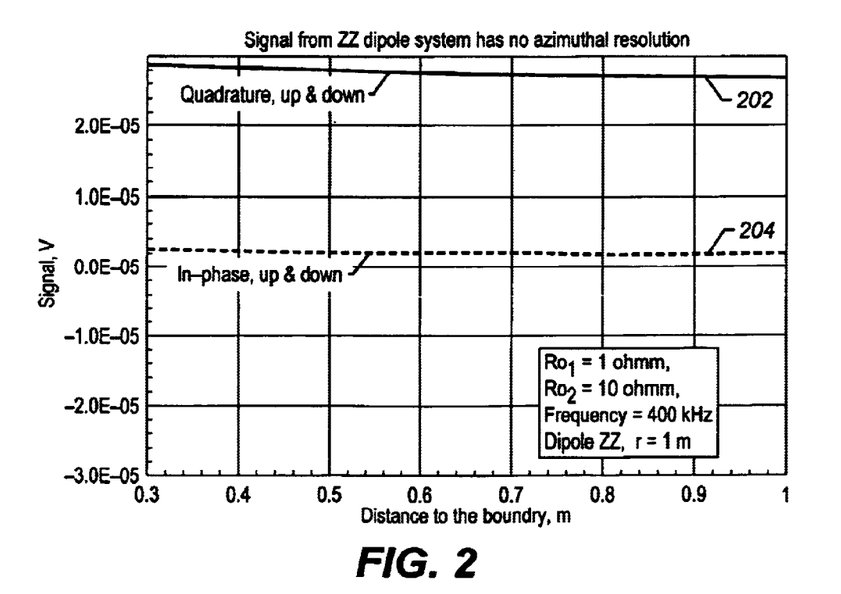
FIG. 2 illustrates how dipole-dipole measurements cannot distinguish between models with up and down boundaries as neither quadrature nor in-phase components change as the boundary position is changed.

FIG. 2. illustrates how dipole-dipole measurements can not distinguish between models with up and down boundaries—neither quadrature 202 nor in-phase 204 components do not change as the boundary position is changed between above the tool (FIG. 1a) and below the tool (FIG. 1b). The situation is not any different if the moments of both transmitting and receiving coils are oriented like in the X direction (parallel to the borehole and boundary layers) as the measurements still cannot distinguish between boundary positioning presented in FIG. 1a in and FIG. 1b.

Figure 3:
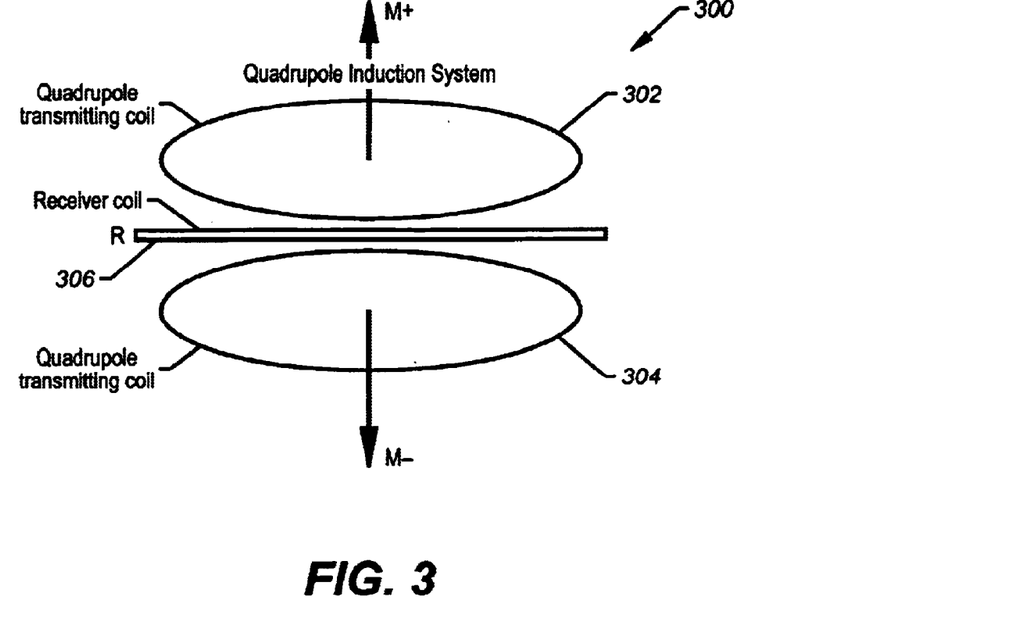
FIG. 3 illustrates a quadrupole transmitter with two similar coils having magnetic moments oriented in opposite direction are used introduce uniqueness in signals from a boundary above and below the tool.
Figure 4:
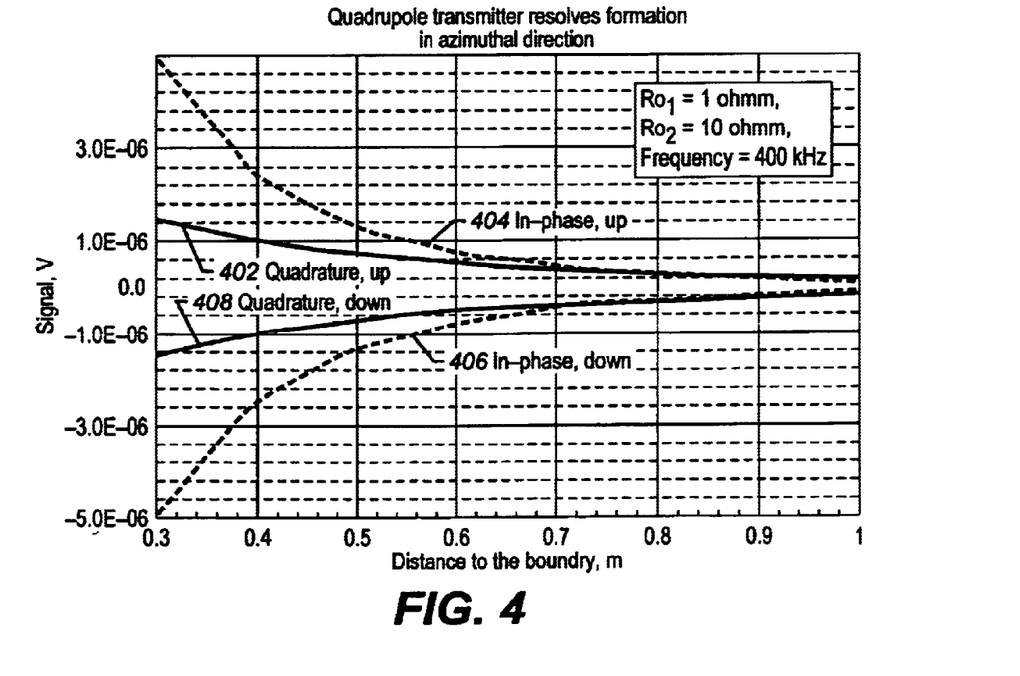
FIG. 4 illustrates a quadrupole transmitter with receiver coil placed in between transmitting coils to differentiate between models with up and down boundaries with a sign reversal generated in both in-phase and quadrature components.

To introduce uniqueness between the measurements of the boundary positioning arrangement shown in FIG. 1a and the boundary positioning arrangement shown in FIG. 1b, the present invention provides a quadrupole transmitter instead of a of dipole transmitter. FIG. 3 illustrates a preferred quadrupole transmitter 300 with two similar transmitter coils 302, 304 having magnetic moments oriented in opposite direction are used to introduce a sign change in readings between FIG. 1a and FIG. 1b. A receiver coil 306 is placed between transmitter coils 302 and 304. Coils 302, 304 are separated by spacing d=10 cm. The moments of the transmitting 302, 304 and receiving 306 coils are substantially perpendicular to the bore hole 930 axis. FIG. 4 illustrates measurements made using a quadrupole transmitter with receiver coil placed in between transmitting coils with opposite polarity moments to differentiate models with up and down boundaries. A sign reversal is observed in both in-phase and quadrature components.

The quadrupole transmitter provides two similar transmitter coils 302, 304 which have magnetic moments oriented in opposite direction as shown in FIG. 3. The coils 302, 304 are separated by spacing d (in the present example of a preferred embodiment, the calculations use d=10 cm). As shown in FIG. 4 quadrupole transmitter 300 with receiver coil 306 placed in between transmitting coils 302, 304 enables the present invention to differentiate between the models shown in FIG. 1a and FIG. 1b. Note that the sign reversal is present in both the in-phase 404 and quadrature 402 components an "up" boundary (above the tool) and the "down" boundary (below the tool) in-phase 406 and quadrature 408 components.

In an alternative embodiment, the reciprocal arrangement is provided when one transmitting coil and quadrupole receiver operate in two modes having opposite orientations of the receiving moments in the directional mode and the coincide orientations in the deep mode.

Figure 5:
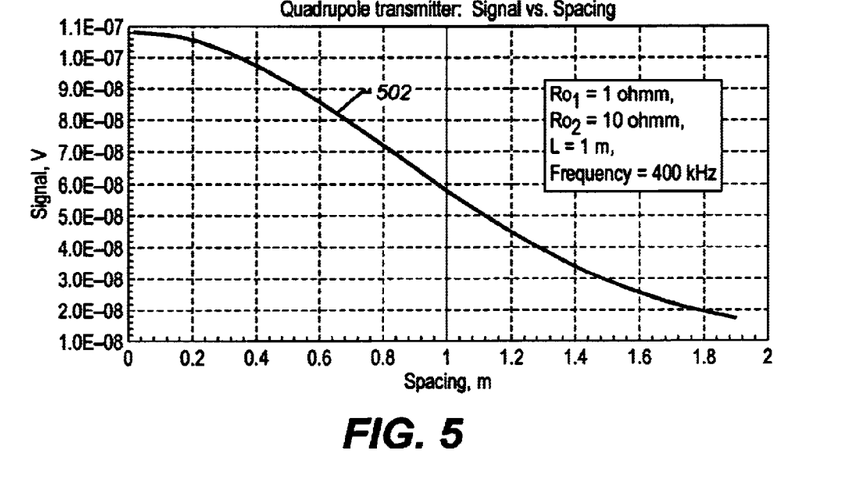
FIG. 5 illustrates a dependency of the receiving signal on spacing S between quadrupole transmitter and dipole receiver.

FIG. 5 illustrates modeling results, which show a dependency at the receiving signal on spacing S (meters) between quadrupole transmitter and dipole receiver. The distance L from transmitter to the boundary is fixed and spacing S is varied. The signal 502 is a smooth function of the spacing and does not drop very fast with a spacing increase. FIG. 5 illustrates mathematical modeling results illustrating dependency of the receiving signal on a spacing S between a quadrupole transmitter and a dipole receiver. In FIG. 5, the distance L from transmitter to the boundary is fixed and spacing S varies. FIG. 5 shows that the amplitude of the signal 502 is a smooth function of the spacing and does not drop very fast with a spacing S increase. FIG. 5 illustrates that increasing the length of the coil increases the measured signal. At the same time the noise in the receiving antenna is proportional to √D where D is optimal antenna size. If the length of the antenna exceeds the optimal size D the benefits of the signal increase will be overcompensated by the large noise level. The optimal coil length is defined as that coil length which provides a maximum of the signal/noise ratio (SNR). Preferably, the maximum of the SNR is defined as $$SNR = \frac{\int_0^L B\,dr}{\sqrt{L}}$$

where B is the induced magnetic field along the path of integration.

Figure 6:
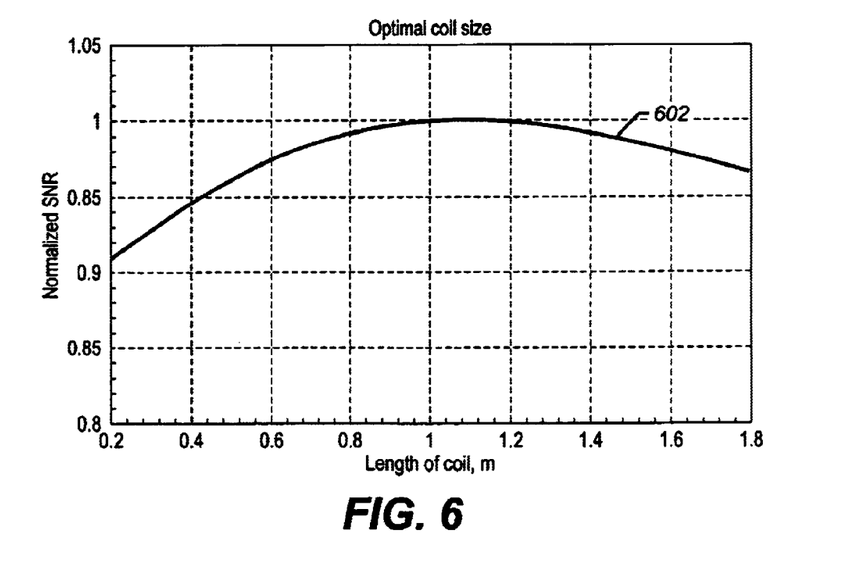
FIG. 6 illustrates that the signal to noise ratio (SNR) is not sensitive to the coil length as a +/−50% deviation from the optimal length results in only a 5% loss of SNR compared to maximum level.

As shown in FIG. 6, the SNR 602 is not overly sensitive to the coil length as a +/−50% deviation from the optimal coil length leads to only 5% loss of SNR compared to maximal level. The estimate of the optimal receiver coil length is for the very short quadrupole transmitter. Since receiver and transmitter characteristics are reciprocal this estimate is also valid for the finite transmitter size. For the purpose of geo-steering the short module consisting of three 1 m long coils with the central coil used as a receiver and two others as a quadrupole transmitter is optimal.

FIG. 6 illustrates the results of the integration. The signal as shown in FIG. 6 has been normalized to the maximal value corresponding to 1 m-coil length. As we can see from FIG. 6 the SNR is substantially insensitive to a coil length. A +/−50% deviation from the optimal length leads to only 5% loss of SNR compared to maximal level. This estimate of the optimal receiver coil length was performed for the very short quadrupole transmitter. Since receiver and transmitter are reciprocal this estimate is also valid for the finite transmitter size as well. Thus, for the purposes of geo-steering, the short module consisting of three 1 m long coils can be used with the central coil used as a receiver and two others as a quadrupole transmitter.

Figure 7:
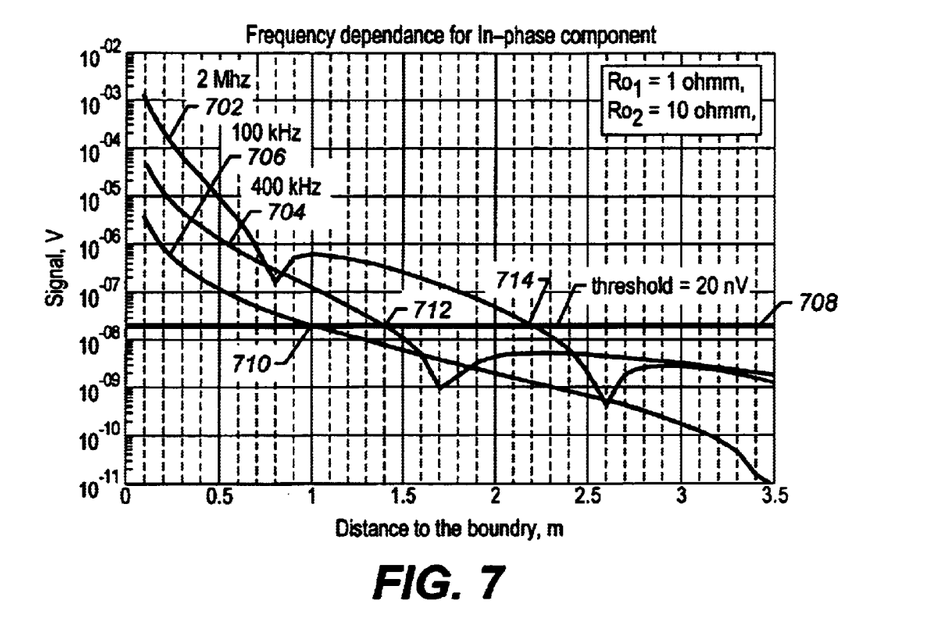
FIG. 7 illustrates mathematical modeling results for a two-layered formation performed at three frequencies—100 kHz, 400 kHz, 2 MHz.
Figure 8:
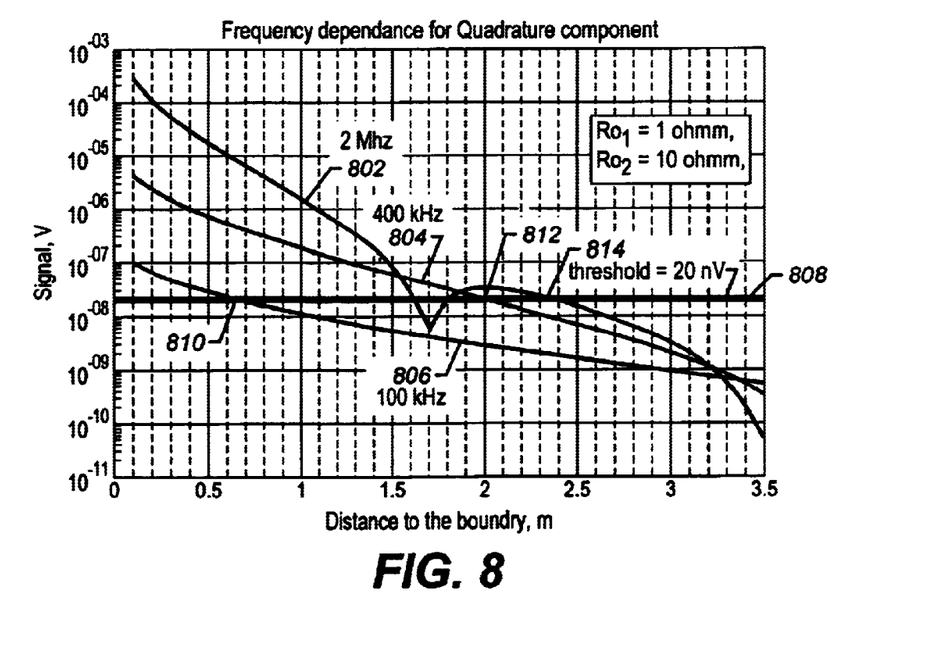
FIG. 8 illustrates the quadrature component depth of investigation of 0.6, 2.0, 2.3 m for 100 kHz, 400 kHz and 2 MHz correspondingly.

FIG. 7 illustrates mathematical modeling results for a two-layered formation performed for the three frequencies—100 kHz 706, 400 kHz 704, 2 MHz 702. All the parameters in the model are fixed except distance to the boundary. The moment of both receiving and transmitting loops are 3.5E-03 m². The distance between coils comprising the quadrupole is 10 cm. Each transmitting coil has 8 turns. In a preferred embodiment, the current strength is 0.64 amp. As shown in FIG. 7 and FIG. 8, frequency dependence of quadrature (FIG. 8) and in-phase (FIG. 7) components are illustrated. A threshold 708 is indicated on the plot, which corresponds to a minimal detectable signal of 20 nV, the signal that can be reliably distinguished from the noise in a preferred embodiment. As shown in FIG. 7, for the in-phase component the maximum depth of investigation achievable with 100 kHz is 1 m 710, while for the 400 kHz and 2 MHz it is 1.4 m 712 and 2.2 m 714 correspondingly.

FIG. 8 illustrates that in the case of the quadrature component, the depth of investigation is 0.6 810, 2.0 812, 2.3 m 814 for 100 kHz 806, 400 kHz 804 and 2 MHz 802 correspondingly. The modeling data show that both in-phase and quadrature component have zero crossings. Thus, the present invention performs measurements at different frequencies to reliably interpret the data and reduce the ambiguity associated with zero crossings.

Directional resistivity may be measured using cross-component coils. One important cross-component combination is a coaxial (Z) transmitter and an orthogonal (X) receiver. Such a combination has the capability of distinguishing targets located above or below, provided that the targets are within the depth of investigation of the device. This directional resistivity capability enables determination of which way the drill bit is approaching the geologic target, that is, whether the geological target is above or below the resistivity tool.

Figure 9:
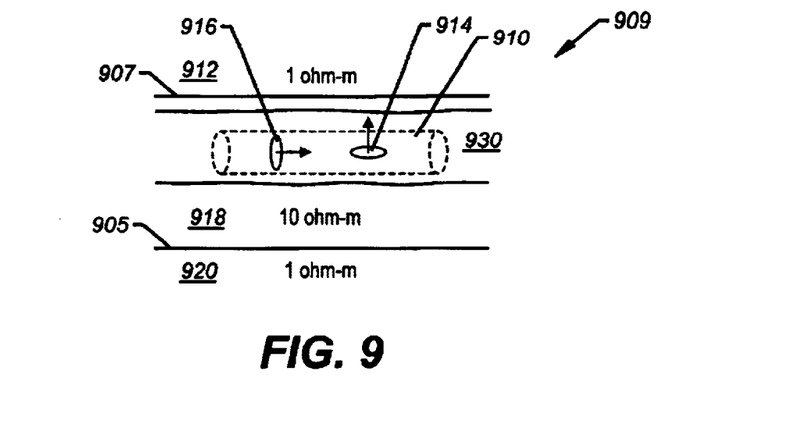
FIG. 9 illustrates a magnetic field measured for a Z-transmitter and an X-receiver in a three-layer formation.

To illustrate of the directionality of cross-component measurement, FIG. 9 shows the magnetic field measured for a Z-transmitter 916 and an X-receiver 914 in a three-layer formation 909. The tool 910 is shown traversing a highly deviated borehole 930 drilled into the formation 909. The upper 912 and lower 920 layers are 1 ohm-m and the middle 918 layer in which the tool 910 resides is 10 ohm-m. The transmitter 916 and receiver 914 are aligned such that the tool axis is parallel to the bed boundaries 905 and 907.

Figure 10:
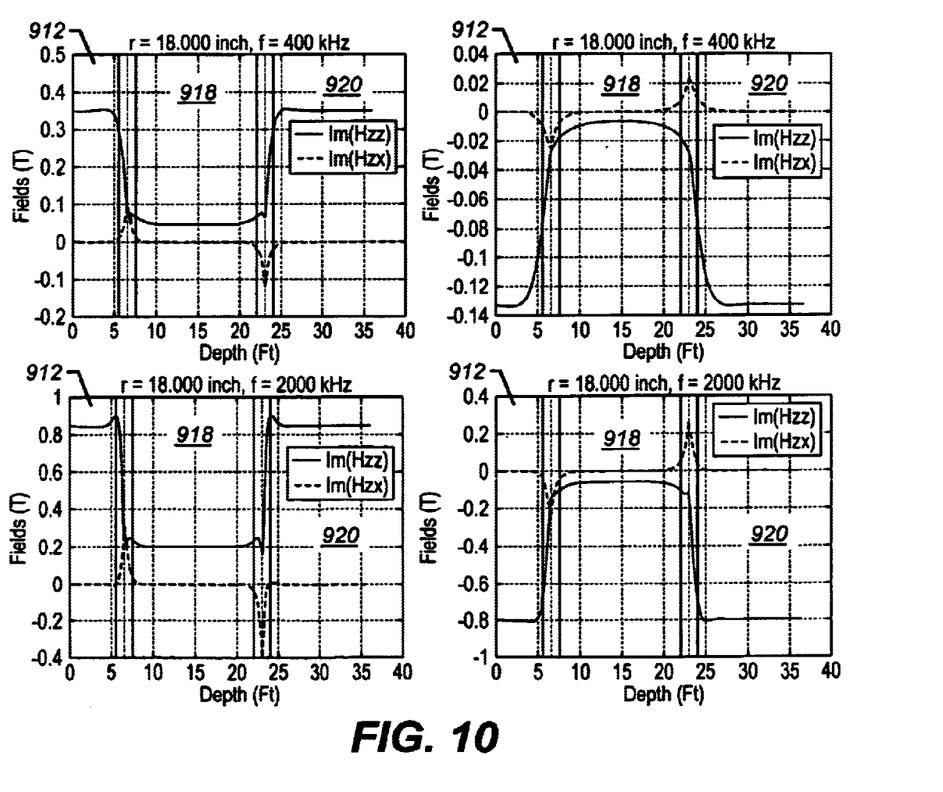
FIG. 10 illustrates that the magnetic field (imaginary part) changes sign as the tools moves from the upper layer boundary 1010 toward the lower boundary layer.

As shown in FIG. 10, observe that the magnetic field (imaginary part) changes sign as the tools moves away from the upper layer boundary 907, between upper layer 912 and middle layer 918 towards the lower boundary 905 between lower layer 920 and middle layer 918. This sign change provides information for distinguishing between approaching layers that are above the tool (such as upper layer 912 in FIG. 9) from layers that are below the tool (such as lower layer 920 in FIG. 9).

Figure 11:
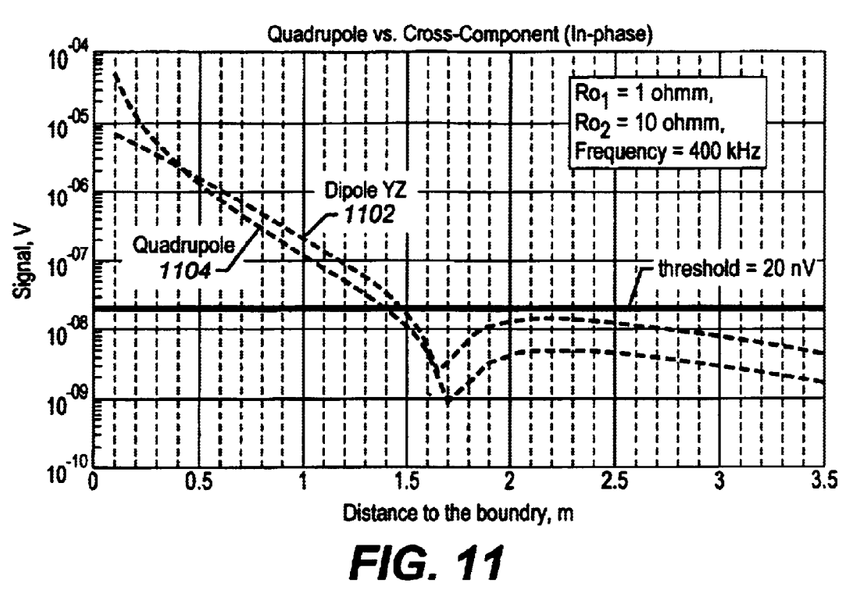
FIG. 11 and FIG. 12 illustrate modeling results of in-phase (FIG. 11) and quadrature (FIG. 12) components for quadrupole and cross-component arrangements.
Figure 12:
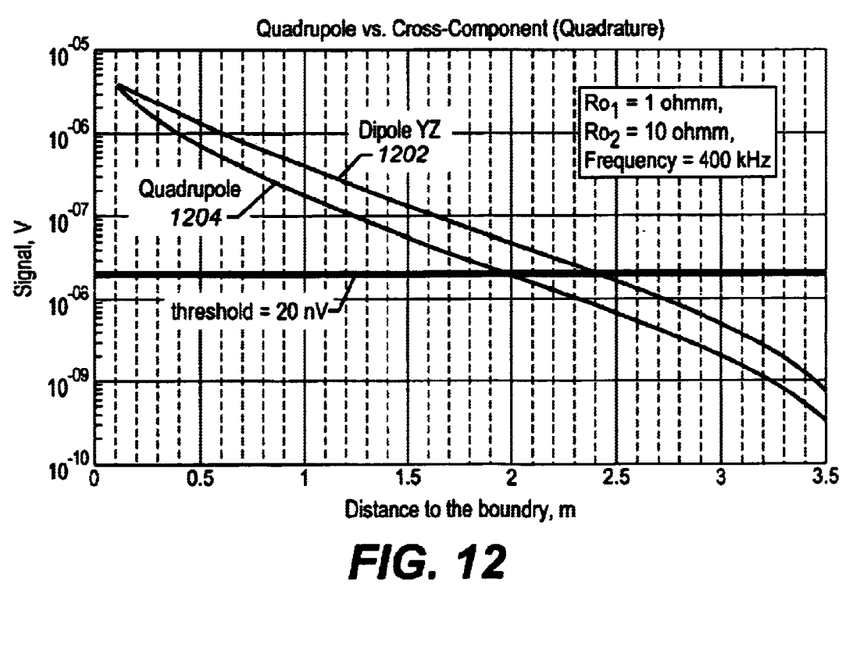

FIG. 11 and FIG. 12 illustrate modeling results of in-phase (FIG. 11) and quadrature (FIG. 12) components for quadrupole and cross-component arrangements. The absolute value of the signal was calculated for the 400 kHz frequency. In the case of cross-component arrangement, a 91-cm spacing between the receiver and transmitter was used. At a frequency of 400 kHz the cross-component measurements provide 20% larger depth of investigation.

In the case illustrated in FIG. 11 and FIG. 12, the dipole-transmitting coil oriented along Y-direction is used as a transmitter and Z-oriented dipole is provided as a receiver. Mathematical modeling results for both quadrupole and cross-component arrangements are presented in FIG. 11 and FIG. 12. Again, two-layered formation model was used and boundary position was varied. As shown in FIG. 11 and FIG. 12, the plots at frequency of 400 kHz of the cross-component measurements provide a 20% increase in the depth of investigation. As the frequency is increased the situation is dynamic.

Figure 13:
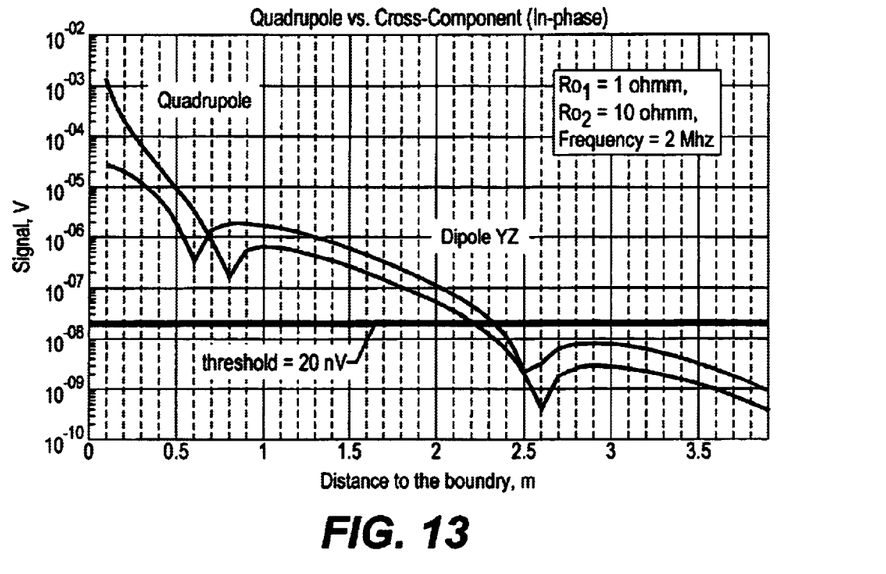
FIG. 13 and FIG. 14 illustrate modeling results of in-phase (FIG. 13) and quadrature (FIG. 14) components for quadrupole and cross-component arrangements.
Figure 14:
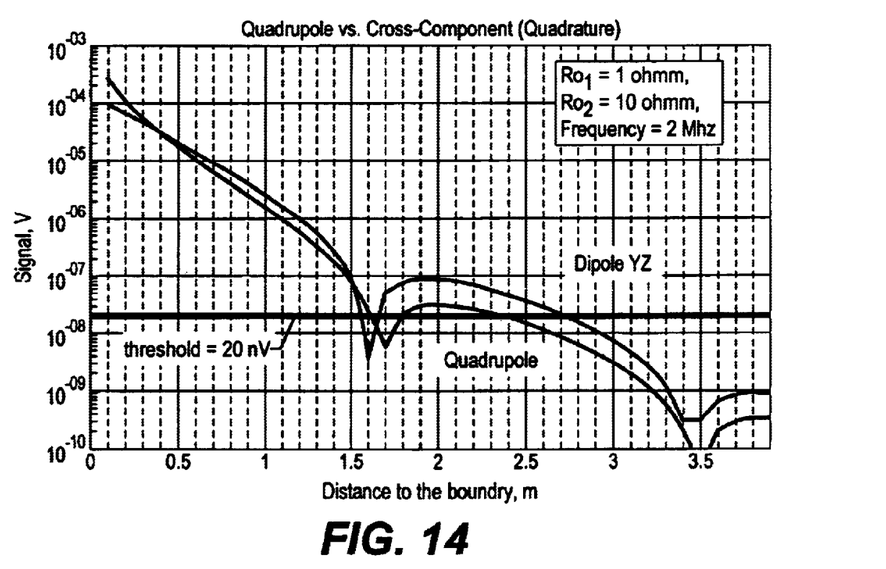

FIG. 13 and FIG. 14 illustrate modeling results of the in-phase (FIG. 13) and the quadrature (FIG. 14) components for quadrupole and cross-component arrangements. At a frequency 2 MHz the quadruple transmitter provides a higher signal level for the shallow depth investigation (0–70 cm) while cross-component arrangement is superior if the higher depth of investigation (0.7–2) m is required. At frequency 2 MHz the cross-component measurements have only 10% larger depth of investigation compared to quadrupole arrangement.

Figure 15:
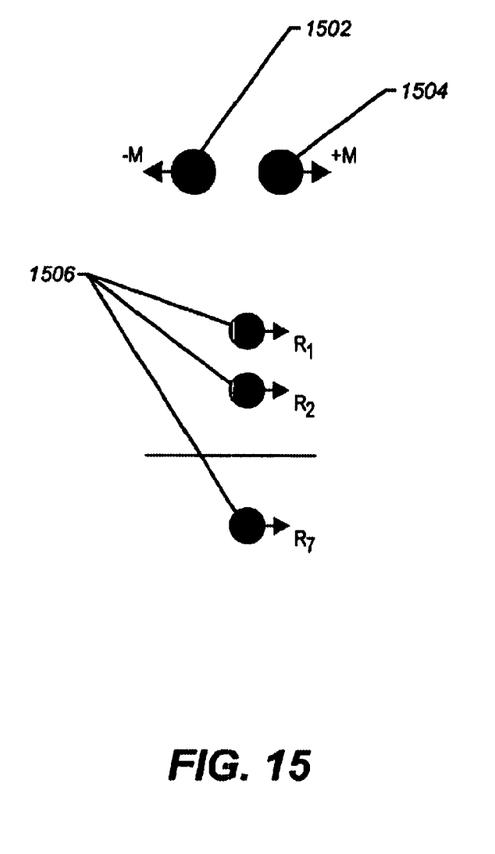
FIG. 15 illustrates an alternative embodiment with a transmitter switched into the directional mode switching configuration.
Figure 16:
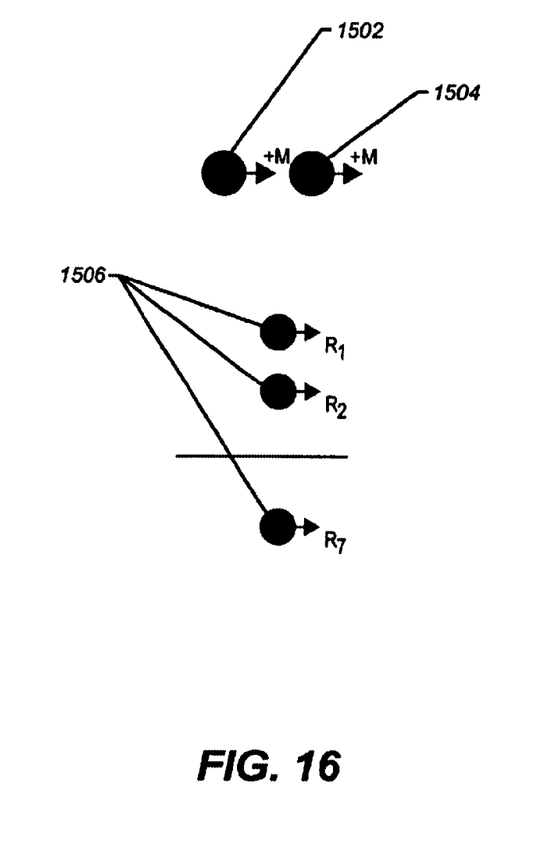
FIG. 16 illustrates an alternative embodiment with a transmitter switch into the deep mode switching configuration.

In an alternative embodiment, another arrangement comprising an array induction tool comprising a dual loop transmitter end an array of receiving coils is provided. The transmitter is provided a polarity switch for switching polarity of the current in each of the two loops. Magnetic moments of the transmitting loops 1502, 1504 are oriented perpendicular to a longitudinal borehole axis. Several receiving coils 1506 oriented along the same direction are placed at the distances of approximately 1 meter apart. The resistivity tool of the present invention acquires data at several operating frequencies in the range of 100 kHz to 2 MHz. By switching polarity of the current in the transmitter the data of both directional and deep mode may be acquired, the directional mode when the moments are in the opposite directions (FIG. 15) and the deep mode when magnetic moments of two transmitting loops have coincide directions (FIG. 6).

In another embodiment of the present invention, the method of the present invention is implemented as a set computer executable of instructions on a computer readable medium, comprising ROM, RAM, CD ROM, Flash or any other computer readable medium, now known or unknown that when executed cause a computer to implement the method of the present invention.

While the foregoing disclosure is directed to the preferred embodiments of the invention various modifications will be apparent to those skilled in the art. It is intended that all variations within the scope of the appended claims be embraced by the foregoing disclosure. Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

What is claimed is:

1. An downhole instrument comprising:
   a quadrupole transmitter for transmitting an electromagnetic signal into a formation adjacent a well bore;
   a receiver for receiving a signal from the formation in response to the transmitted electromagnetic signal; and
   a processor for determining from the received signal a direction for an interface between layers in the formation.

2. The instrument of claim 1, wherein:
   the quadrupole transmitter further comprises a first transmitter coil having a moment pointing in a first direction and a second transmitter coil having a moment pointing in a second direction.

3. The instrument of claim 2, further comprising:
   a receiver positioned between the first and second transmitter coils.

4. The instrument of claim 2, wherein the first transmitter coil and second transmitter coil are separated by a distance of approximately 10 cm.

5. The instrument of claim 2 further comprising:
   a switch for reversing a direction for a current flowing in the first transmitter coil so that the moment of the first transmitter coil and the moment of the second transmitter coil point in the same direction for obtaining array-type induction measurements resistitivy data.

6. The instrument of claim 1, further comprising: electronics for exciting the transmitter at a frequency between about 100 kHz to 2 MHz.

7. The instrument of claim 2, wherein the transmitter coil moments cancel eddy currents associated with the transmitter coils.

8. The instrument of claim 1, wherein the transmitter transmits at different frequencies to reduce the ambiguity associated with zero crossings.

9. The instrument of claim 1,
   wherein the signal further comprises a sign reversal wherein the processor uses the sign reversal to differentiate between a signal received from a boundary for a layer above the instrument and a signal received from a boundary for a layer below the instrument.

10. The instrument of claim 2, further comprising:
    an array of receivers for obtaining array-type induction measurements resistitivy data.

11. A method for determining the direction of an interface between layers of a formation comprising:
    transmitting an electromagnetic signal using a quadrupole transmitter into the formation adjacent a well bore;
    receiving a signal from the formation in response to the transmitted electromagnetic signal; and
    determining from polarity of the received signal a direction for an interface between the layers in the formation.

12. The method of claim 11, further comprising:
    directing a current into a first transmitter of the quadrupole transmitter thereby generating a moment pointing in a first moment direction; and
    directing the current into a second transmitter coil of the quadrupole transmitter thereby generating a moment pointing in a direction opposite to the first moment direction.

13. The method of 12, further comprising:
    positioning a receiver between the first and second transmitter coils for receiving a signal from the formation.

14. The method of claim 13, further comprising:
    separating the first transmitter coil and second transmitter coil by a distance of approximately 10 cm.

15. The method of claim 12 further comprising:
    reversing a direction of the current flowing in the first transmitter coil so that the moment of the first transmitter coil and the moment of the second transmitter coil point in the same direction for obtaining array-type induction resistivity measurement data.

16. The method of claim 11, further comprising:
    exciting the transmitter at a frequency between about 100 kHz to 2 MHz.

17. The method of claim 12, further comprising:
    generating opposing transmitter coil moments for canceling eddy currents associated with the transmitter coils.

18. The method of claim 11 further comprising:
    obtaining array-type induction measurements resistitivy data.

19. The method of claim 11, further comprising:
    processing an in-phase component and quadrature component of the signal received from the formation.

20. The method of claim 11, further comprising:
    detecting a sign reversal between a signal received from an up boundary for an interface above the instrument and a signal received from a down boundary for an interface below the instrument.

21. A computer readable medium containing instruction that when executed by a computer perform a method for determining the direction of an interface in a formation comprising:
    transmitting an electromagnetic signal using a quadrupole transmitter into a formation;
    receiving a signal from the formation in response to the transmitted electromagnetic signal; and
    determining from the polarity of the received signal a direction for the interface between layers in the formation.

22. The medium of claim 21, wherein the method further comprises:
    directing a current into a first transmitter of the quadrupole transmitter thereby generating a moment pointing in a first moment direction; and
    directing a current into a second transmitter coil of the quadrupole transmitter thereby generating a moment pointing in a second direction.

23. The medium of claim 22, the method further comprising:
    reversing of the direction for a current flowing in the first transmitter coil so that the moment of the first transmitter coil and the moment of the second transmitter coil point in the same direction for obtaining array type induction measurements resistivity data.

24. The medium of claim 21, the method further comprising:

exciting the transmitter at at a frequency between about 100 kHz to 2MHz.

25. The medium of claim 22, the method further comprising:

generating opposing transmitter coil moments for canceling eddy currents induced associated with the transmitter coils.

26. The medium of claim 21, the method further comprising:

obtaining array type induction measurements resistitivy data.

27. The medium of claim 21, the method further comprising:

processing an in-phase component and quadrature component of the signal received from the formation.

28. The medium of claim 21, the method further comprising:

detecting a sign reversal between a signal received from an up boundary for a layer above the instrument and a signal received from a down boundary for a layer below the instrument.

29. The instrument of claim 1, wherein the interface is a bed boundary.

30. The method of claim 11, the method further comprising determining from polarity of the received signal a direction of a bed boundary between layers in said formation.

31. The medium of claim 21, the method further comprising determining from polarity of the received signal a direction of a bed boundary between layers in said formation.

* * * * *